United States Patent Office 3,553,551
Patented Jan. 5, 1971

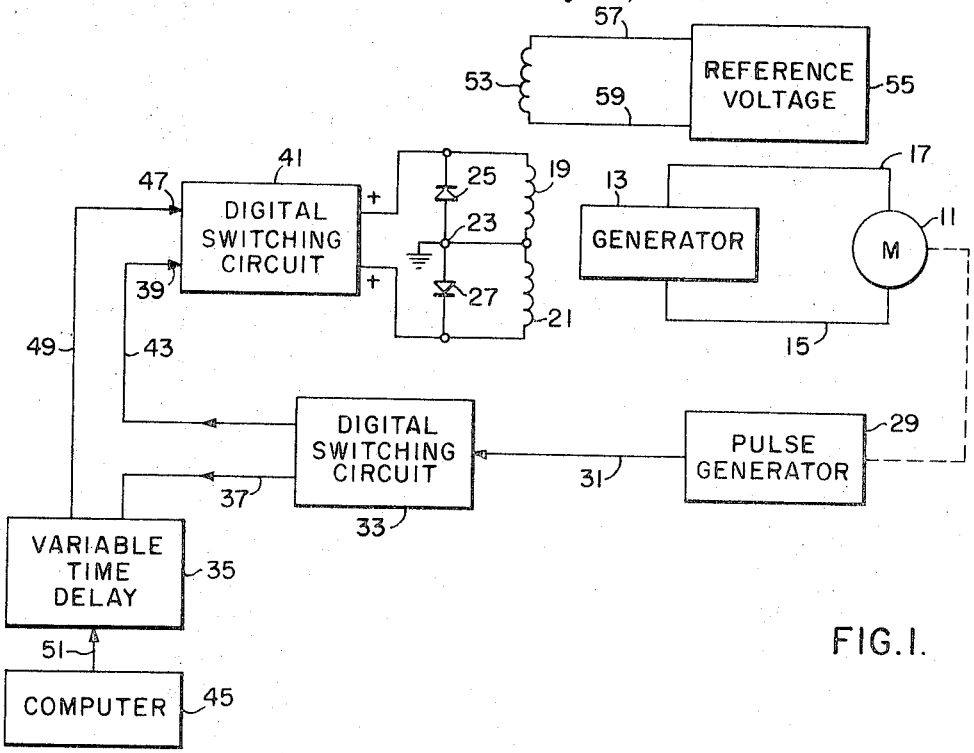
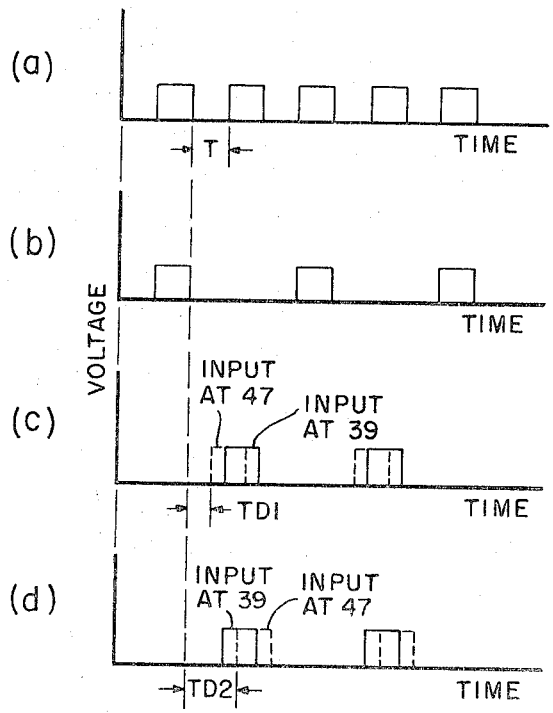
FIG.1.
FIG.2.
INVENTOR
Wayne E. Arnold
BY
ATTORNEY

3,553,551
DIGITAL SPEED CONTROL APPARATUS
Wayne E. Arnold, Murrysville, Pa., assignor to Westinghouse Electric Corporation, Pittsburgh, Pa., a corporation of Pennsylvania
Filed May 28, 1969, Ser. No. 828,624
Int. Cl. H02p 5/24
U.S. Cl. 318—146                                        8 Claims

ABSTRACT OF THE DISCLOSURE

This disclosure describes a digital control apparatus for motor speed regulation, wherein pulses proportional to the speed of the motor to be controlled are alternately sent to a variable time delay element and to an output switching circuit, and after a controlled time delay, the pulses from the variable time delay element are also sent to the output switching circuit; depending upon which pulses first reach the output switching circuit, a signal will be provided to either speed up or slow down the motor, with the desired speed of the motor being determined by a computer which controls the variable time delay.

BACKGROUND OF THE INVENTION

The present apparatus relates, in general, to a regulator system and, more particularly, to a speed regulation system wherein the rotational speed of the device is controlled directly by digital, as opposed to analog, circuitry.

There are many commercially important uses for motor speed regulation. In the steel industry, for example, it is desirable that the speed of the roll tables, roll sets, and position regulators be continuously monitored and controlled to operate within certain prescribed limits. Also, in automatic electric train systems, the speed of the vehicle must be accurately controlled at all times to insure the proper operation of the system and the safety of the passengers. Achieving desired operation and control has conventionally been accomplished through the use of analog regulators which must be carefully designed to minimize drift due to changes in equipment and ambient temperatures. Moreover, such conventional analog regulation systems must normally be altered significantly to accommodate motors of different horsepower or motors which have been specifically designed for a particular purpose.

Existing direct digital control systems are expensive and have several significant limitations. For example, in one system, pulses proportional to the angular velocity of the motor shaft are fed into a large binary counter for a predetermined interval of time. A computer determines the correct number of pulses which the rotating shaft would produce if it rotates at the correct speed and stores this information in a second counter. A comparison is then made between the number of pulses stored in the first and second counters. If the number of pulses in the first counter differs from that in the second counter, an error signal is generated to alter the speed of the motor.

It can be seen that such a regulation system requires at least two counters capable of holding a large number of bits of information plus comparison logic circuitry; all of which is expensive and bulky. Also, during the interval in which the pulses from the shaft are being counted there can be no regulation of the motor speed; this results in a slow response time and all of the drawbacks associated with regulators having slow response characteristics.

SUMMARY OF THE INVENTION

In accordance with the principles of the present invention a pulse generator provides a pulse train whose frequency is proportional to the angular velocity of the shaft of the motor. These pulses are applied to the input of a first switching or toggle circuit which alternately applies pulses to both a variable time delay element and to one input of a second switching or toggle circuit.

Each pulse to the variable time delay element starts a timer. After a predetermined time delay, which may be controlled by a computer and relayed to the variable time delay element through contact closures, the time delay element provides a pulse to another input of the second switching or toggle circuit. The length of the time delay, determined by the computer, will correspond to the time between the pulses of a pulse train which would be generated by the pulse generator if the motor was running at the correct speed. If the output from the time delay element reaches the input of the second switching device before the corresponding pulse from the first switching circuit reaches the other input of the second switching circuit, it means that the motor speed is too low. The toggle or output switching circuit then applies a voltage to the forward field and removes it from the reverse field of the generator supplying power to the motor, thereby causing the speed of the motor to increase. Conversely, if the pulse from the first switching circuit reaches the second switching circuit before the pulse from the variable time delay element, the reverse field is energized and the forward field is de-energized, thereby causing the speed of the motor to decrease.

It is, therefore, an object of the present invention to provide a new and improved digital speed regulator.

Another object of the present invention is to provide a new and improved digital speed regulator which is more stable and less sensitive to drive resulting from environmental temperature changes.

Another object of the present invention is to provide permits the use of simple and inexpensive components and which can more easily be mounted on a single printed circuit board.

Another object of the present invention is to provide a new and improved digital speed regulator which has a faster response time to changes in the speed of a motor.

Another object of the present invention is to provide a new and improved digital speed regulator which is more easily and inexpensively adjustable to motors of varying horsepower ratings.

These and further objects of the present invention will become apparent from the following detailed specification taken in connection with the attached drawings.

BRIEF DESCRIPTION OF THE DRAWINGS

FIG. 1 shows a diagrammatic representation of a digital speed regulator in accordance with the principles of the invention, and FIG. 2 shows the signal waveforms involved in the operation of the present invention.

DESCRIPTION OF THE PREFERRED EMBODIMENT

Shown in FIG. 1 is a non-reversing motor 11 which is to be regulated. The motor 11 is powered by a generator 13 via power lines 15 and 17. The generator is provided with a forward field winding 19 and a reverse field winding 21. The common ends of these windings are grounded at 23. If a positive voltage is placed across forward field winding 19 the output voltage from the generator 13 will increase and thereby cause the speed of the motor 11 to increase. Conversely, if a positive voltage is placed across reverse field winding 21 the voltage output from generator 13 will decrease and the speed of the motor 11 will also decrease. Diodes 25 and 27 are connected across the forward and reverse generator fields 19 and 21, respectively, to provide current paths for the two respective fields in the directions as shown.

Pulse generator 29 provides a train of pulses at a frequency proportional to the speed of the coupled motor shaft. Suitable pulse generators are well known in the art and typically may consist of a coil which is electromagnetically coupled with a small magnetic field rotating on the motor shaft. Each time the rotating field passes the stationary coil a current pulse is induced in the coil. These pulses are then sent through shaping and limiting circuitry to provide for a continuous and uniform pulse train.

This pulse train is fed through line 31 to a digital switching or toggle circuit 33, which can comprise a well known single input flip-flop as shown and described, for example, on pp. 534–535, section 13–40, of the 1967 edition of the RCA Transistor Manual, that alternately applies the incoming pulses to a variable time delay element 35 through conductor 37 and through conductor 43 to a first input 39 of a second digital switching or toggle circuit 41, the construction of which is also well known to those skilled in this art. When a pulse from toggle 33 reaches the variable time delay 35 a time delay operation is started. After a predetermined time delay, a pulse is sent by the time delay 35 to the second input 47 of toggle 41 via path 49. The time delay may be determined by selected closures in a manner well known in this art and which are regulated by a computer 45 through connection 51.

It can be seen that depending upon the length of the established time delay and the amount of time between pulses from the pulse generator 29 either the delayed pulse from the variable time delay 35 or the next succeeding pulse from the toggle 33 will arrive at toggle 41 first. Should the delayed pulse arrive at toggle 41 first, then toggle 41 will apply a voltage across the forward field winding 19 of of generator 13 to speed up motor 11. At the same time, the delayed pulse will be applied to cause the toggle 41 to disable input 39 for a time interval such that the arrival of the pulse from the toggle 33 will not cause an ambiguous change of state in toggle 41. Should the pulse from toggle 31 arrive at toggle 41 before the delayed pulse from the variable time delay 35, then toggle 41 will apply a voltage across the reverse field winding 21 of the generator 13 to slow down motor 11. The pulse from toggle 33, likewise, will be applied by toggle 41 to disable input 47 to make the later arrival of the delayed pulse at input 47 ineffectual to cause an ambiguous change in the state of the toggle 41.

The computer 45 acting pursuant to a computer program written by a human operator calculates the desired momentary spacing of a train of pulses for a motor rotating at the correct speed. The computer then sets the contact closures of the time delay 35 to match this calculation.

Suppose that the actual speed of motor 11 is less than the correct speed as determined by computer 45. Then the temporal spacing of the pulses from pulse generator 29 will be greater, since the pulse frequency is too low, than they would be if the motor was running at the correct speed. Toggle 33 will send the first pulse generator 29 to the variable time delay 35. The timer function is then started and a pulse is sent to toggle 44 after the correct time delay determined by the computer 45. Since the motor is running slower than the correct speed the time between the second pulse and the first pulse will be greater than the time delay and the second pulse from the pulse generator 29 operative with toggle 33 will "lose" the race with the delayed pulse to toggle 41 and the forward field will be energized. The third pulse from the pulse generator 29 resets the variable time delay and there will be another "race" to toggle 41 with the fourth pulse from the pulse generator. If the motor is still running too slowly the delayed pulse will again arrive at toggle 41 first and the forward field will remain energized, and the motor 11 will continue to speed up.

If the speed of the motor becomes faster than the correct speed then the spacing between the pulses from pulse generator 29 will decrease below the time delay period calculated by the computer. When this happens the delayed pulse will lose the race to the toggle 41 in relation to the next succeeding pulse from pulse generator 29, and the reverse field winding 21 will be energized causing the motor 11 to decrease in speed.

The pulse sequence may be better understood by reference to FIG. 2. FIG. 2a shows the output of pulse generator 29. The temporal spacing T between the pulses is a function of the rotational speed of the motor being regulated. As the motor speeds up, the time between pulses will decrease. Likewise, as the motors slow down, the time between pulses increases.

FIG. 2b shows the pulses arriving at the variable time delay 35 from digital switching circuit 33. It can be seen that only every other output pulse from the pulse generator is directed by the first switching circuit 33 to the variable time delay 35. The alternate pulses are sent by first switching circuit 33 to input 39 of second switching circuit 41. These latter pulses are shown in FIGS. 2c and 2d as the solid-lined pulses.

Referring to FIGS. 2c and 2d, the pulses represented by the dotted lines are the pulses arriving at input 47 of switching circuit 41 from the variable time delay 35. In FIG. 2c time delay TD1 set by computer 45, is smaller than the temporal spacing T between the output pulses from pulse generator 29. As a result the forward field 19 of generator 13 will be energized and the speed of the motor will increase. FIG. 2d illustrates the converse of the above; the computer there has determined that the motor should be slowed down. It therefore has set the variable time delay to produce a delay of TD2 which is greater than the interval T in FIG. 2a. Hence the pulse from digital switching circuit 33 "wins" the race to digital switching circuit 41 resulting in a voltage across reverse field 21 of generator 13 causing the motor 11 to slow down.

Unlike other digital speed regulators in which no regulation takes place during the time that the pulse train is being stored in a binary counter, it can be seen that in accordance with the teachings of the present invention every other pulse is used to regulate the motor, with the alternate pulses used to set the timer in the variable time delay 35. This results in a speed regulator which is more responsive to errors in the motor speed than previous digital speed regulators. The response speed of the regulator hereinabove described is further increased since the generator fields are forced with full voltage even for small changes. Furthermore, since no large binary counters are required all of the circuitry can be placed on a single printed circuit card.

The only direct linkage between the motor being regulated and the above described regulator is the electromagnetic coupling between the motor shaft and pulse generator 29. Since no mechanical linkage is required it can be seen that this regulator is easily adaptable to motors of varying size and horsepower ratings.

Since this speed regulator provides direct digital control, changes in the temperature of the environment or other equipment will under most circumstances have no effect in the operation of the regulator. This results in a significant advantage over analog speed control regulators which are very susceptible to changes in temperature and which, if not corrected for by expensive and complex circuitry, will result in serious error in the motor speed control.

As explained hereinbefore diodes 25 and 27 provide current paths for the forward and reverse generator fields. These fields in turn due to their inductances act as digital to analog converters. Thus, while pulsed voltage is alternately applied and removed by toggle 41 to these field coils, the current in the field will be proportional to the average of the pulsed field voltages. Since the motor speed is proportional to the generator output voltage and since the output voltage is proportional to the field current, the motor speed is also proportional to the average field currents.

The particular embodiment of the regulator herein described has been designed for a non-reversing motor 11, i.e., a motor whose shaft rotates in only one direction. However, it should be understood that this invention should not be so limited and can also be used with reversing motors.

The regulator may also be designed to be operable above some minimum base speed. One way to bring the motor speed up to this minimum or jog speed is to provide the generator 13 with an additional winding 53. A controlled reference voltage 55 is connected by conductors 57 and 59 to field winding 53. Once the motor reaches the minimum speed the regulating operation of the regulator takes over. An undervoltage relay may be included to disable the motor 11 and prevent the switching circuit pulses from functioning should the motor speed drop below the jog speed. In addition well known current limit and rate feedbacks may be provided to insure against runaway operation of motor 11.

The present invention has been described with particularity, however, it will be understood that modifications and changes may be made within the spirit and scope of this invention.

What is claimed is:

1. In control apparatus for a motor, the combination including:
   first pulse switching means having an input and having at least two outputs and being operable to alternately provide output pulse signals at said outputs in response to incoming pulses;
   pulse means responsive to said motor to provide a train of said incoming pulses to said first switching means, with the frequency of said pulse train being related to the speed of said motor;
   variable time delay means responsive to pulse signals from one of said outputs oef the first pulse switching means for providing a time delay proportional to the desired speed of the motor being controlled;
   second pulse switching means having a first input connected to receive the delayed pulse signals from the variable time delay means and having a second input connected to receive pulse signals from the other output of said first pulse switching means; and
   with the second pulse switching means being operable to speed-up said motor whenever a delayed pulse signal from the variable time delay means reaches the first input of the second pulse switching means before a pulse signal from the other output of said first pulse switching means reaches the second input of the second pulse switching means, and wherein the second pulse switching means is operable to decrease the speed of said motor whenever a pulse signal from the first pulse switching means reaches the second input of the second pulse switching means before the delayed pulse signal from the variable time delay means reaches the first input of the second pulse switching means.

2. Motor control apparatus as in claim 1, wherein the variable time delay means is controlled in accordance with a desired motor speed as stored in the program of a digital computer.

3. Motor control apparatus as in claim 1, wherein the second pulse switching means is operable to provide a voltage across the forward field of a generator operative to energize said motor to increase the speed of said motor and wherein the second pulse switching means is operable to provide a voltage across the reverse field of said generator to decrease the speed of said motor.

4. Motor control apparatus as in claim 1, wherein the arrival at the second pulse switching means of a delayed pulse signal before a pulse signal from the first pulse switching means is operable to disable the second input for a predetermined time period, and wherein the arrival of a pulse signal from the first pulse switching means before a pulse signal from the variable time delay means is operable to disable the first input for a predetermined time period.

5. The method of regulating the speed of a motor comprising the steps of:
   creating a train of pulse signals having a frequency proportional to the actual speed of the motor to be regulated;
   alternately applying the pulse signals of said pulse signal train to a first input of a pulse signal switching circuit and then to a variable time delay means;
   delaying each pulse signal received by the variable time delay means for an amount of time in accordance with the desired speed of the motor to be regulated;
   transmitting each delayed pulse signal to a second input of said pulse signal switching circuit;
   speeding up the motor being regulated whenever the delayed pulse signal reaches said second input of the switching circuit before the alternate pulse signal reaches said first input of the switching circuit; and
   slowing down the motor being regulated whenever the pulse signal arrives at said first input of the switching circuit before the delayed pulse signal reaches said second input of the switching circuit.

6. The method of claim 5, wherein the speeding up of the motor being regulated is effected by energizing the forward field of a generator coupled to said motor and wherein slowing down of the motor is effected by energizing the reverse field of said generator.

7. The method as in claim 5, wherein the step of delaying the pulse signals received at the variable time delay means includes controlling said amount of time in accordance with a desired speed signal supplied by a programmed digital computer operative to determine said amount of time in accordance with a desired operating speed for said motor.

8. The method as in claim 5, including the additional step of disabling said first input whenever the delayed pulse signal reaches the second input of said switching circuit before the alternate pulse signal and disabling the second input of the switching circuit whenever the alternate pulse signal reaches the switching circuit before the delayed pulse signal.

References Cited

UNITED STATES PATENTS

| | | | |
|---|---|---|---|
| 3,426,262 | 2/1969 | Colter | 318—341 |
| 3,176,208 | 3/1965 | Gifft | 318—314 |

ORIS L. RADER, Primary Examiner

T. LANGER, Assistant Examiner

U.S. Cl. X.R.
318—318, 327, 329